(12) United States Patent
Frake et al.

(10) Patent No.: US 7,722,362 B2
(45) Date of Patent: May 25, 2010

(54) SENSOR ADAPTOR CIRCUIT HOUSING INCAPSULATING CONNECTION OF AN INPUT CONNECTOR WITH A WIRE

(75) Inventors: Robert K. Frake, Wonder Lake, IL (US); David P. Culbertson, Bristol, WI (US); Daniel D. Harvey, Lake Geneva, WI (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 285 days.

(21) Appl. No.: 11/767,373

(22) Filed: Jun. 22, 2007

(65) Prior Publication Data

US 2008/0026610 A1 Jan. 31, 2008

Related U.S. Application Data

(60) Provisional application No. 60/815,621, filed on Jun. 22, 2006.

(51) Int. Cl.
*H01R 12/00* (2006.01)
(52) U.S. Cl. ..................................... 439/76.1
(58) Field of Classification Search ................ 439/76.1, 439/676, 835, 519, 80
See application file for complete search history.

(56) References Cited

U.S. PATENT DOCUMENTS 3,648,220 A * 3/1972 Julinot ......................... 439/80

| 3,934,786 A | 1/1976 | Kozak et al. |
| 3,954,507 A | 5/1976 | Carter |
| 3,963,316 A | 6/1976 | Williams |
| 3,984,912 A | 10/1976 | Johnston et al. |
| 3,994,552 A | 11/1976 | Selvin |
| 4,039,244 A | 8/1977 | Leachy |

(Continued)

FOREIGN PATENT DOCUMENTS

DE 4114921 11/1992

(Continued)

OTHER PUBLICATIONS

U.S. Appl. No. 11/767,362, filed Jun. 22, 2007, Culbertson, et al.

(Continued)

*Primary Examiner*—Chandrika Prasad
(74) *Attorney, Agent, or Firm*—Brinks Hofer Gilson & Lione

(57) ABSTRACT

A sensor adaptor circuit housing assembly and method of manufacturing includes a circuit board, a housing, an input wire, and a connector. The circuit board includes an electrical circuit configured for receiving a sensor signal and generating a sensor characteristic in response to the received sensor signal. The housing includes a body and a cavity defined by inner surfaces of the body and adapted for receiving the circuit board, the circuit board being positioned within the cavity. The input wire is configured for receiving the signal from a sensor and can be formed with an insulated solid or stranded conductor. The connector includes a unitary body, a first end of the unitary body attached directly to an end of the input wire, a second end of the unitary body positioned within the cavity and attached directly to the circuit board and making a first electrical connection with the electrical circuit.

23 Claims, 9 Drawing Sheets

U.S. PATENT DOCUMENTS

| | | | |
|---|---|---|---|
| 4,066,325 A | 1/1978 | Pearce, Jr. et al. |
| 4,072,394 A | 2/1978 | Waldron et al. |
| 4,120,556 A | 10/1978 | Waldron et al. |
| 4,129,351 A | 12/1978 | Sugimoto et al. |
| 4,152,578 A | 5/1979 | Jacobs |
| 4,206,648 A | 6/1980 | Tuska et al. |
| 4,206,958 A | 6/1980 | Hall et al. |
| 4,223,968 A | 9/1980 | Kawabata et al. |
| 4,252,397 A | 2/1981 | Eigenbrode et al. |
| 4,258,974 A | 3/1981 | Kuo et al. |
| 4,262,983 A | 4/1981 | Bogese, II |
| 4,273,407 A | 6/1981 | Snuffer et al. |
| 4,315,662 A | 2/1982 | Greenwood et al. |
| 4,332,430 A | 6/1982 | Clark |
| 4,343,523 A | 8/1982 | Cairns et al. |
| 4,352,538 A | 10/1982 | Fowler |
| 4,392,703 A | 7/1983 | Hall et al. |
| 4,417,395 A | 11/1983 | Hall et al. |
| 4,431,252 A | 2/1984 | Cairns et al. |
| 4,457,570 A | 7/1984 | Bogese, II |
| 4,461,530 A | 7/1984 | Brush, Sr. et al. |
| 4,470,100 A | 9/1984 | Rebaudo et al. |
| 4,517,625 A | 5/1985 | Frink et al. |
| 4,533,202 A | 8/1985 | Pohl |
| 4,538,623 A | 9/1985 | Proctor et al. |
| 4,556,265 A | 12/1985 | Cunningham |
| 4,579,406 A | 4/1986 | Laursen et al. |
| 4,581,478 A | 4/1986 | Pugh et al. |
| 4,598,963 A | 7/1986 | White et al. |
| 4,641,901 A | 2/1987 | Brennan et al. |
| 4,695,112 A | 9/1987 | Maston et al. |
| 4,707,657 A | 11/1987 | Boegh-Petersen |
| 4,717,217 A | 1/1988 | Bogese, II |
| 4,726,775 A | 2/1988 | Owen |
| 4,833,402 A | 5/1989 | Boegh-Petersen |
| 4,868,967 A | 9/1989 | Holt et al. |
| 4,871,319 A | 10/1989 | Babow |
| 4,871,326 A | 10/1989 | Coon |
| 4,875,865 A | 10/1989 | Demler, Jr. et al. |
| 4,894,906 A | 1/1990 | Huang |
| 4,900,258 A | 2/1990 | Hnatuck et al. |
| 4,912,772 A | 3/1990 | Beaudry, Jr. et al. |
| 4,922,607 A | 5/1990 | Doan et al. |
| 4,939,454 A | 7/1990 | Miner |
| 4,985,000 A | 1/1991 | Tengler et al. |
| 5,046,952 A | 9/1991 | Cohen et al. |
| 5,070,597 A | 12/1991 | Holt et al. |
| 5,171,166 A | 12/1992 | Sato et al. |
| 5,188,536 A | 2/1993 | Ganthier et al. |
| 5,200,574 A | 4/1993 | Cunningham et al. |
| 5,214,243 A | 5/1993 | Johnson |
| 5,215,471 A | 6/1993 | Reymond et al. |
| 5,241,910 A | 9/1993 | Cunningham et al. |
| 5,266,903 A | 11/1993 | Foster |
| 5,302,934 A | 4/1994 | Hart et al. |
| 5,369,225 A | 11/1994 | Natwig et al. |
| 5,370,554 A | 12/1994 | Koyasu |
| 5,393,932 A | 2/1995 | Young et al. |
| 5,486,113 A | 1/1996 | Lundh |
| 5,491,321 A | 2/1996 | Stuart et al. |
| 5,533,901 A | 7/1996 | Hunt et al. |
| 5,609,491 A | 3/1997 | Cooper et al. |
| 5,649,974 A | 7/1997 | Nelson et al. |
| 5,676,694 A | 10/1997 | Boser et al. |
| 5,728,149 A | 3/1998 | Laske et al. |
| 5,730,607 A | 3/1998 | Darty |
| 5,791,919 A | 8/1998 | Brisson et al. |
| 5,795,196 A | 8/1998 | Hotea et al. |
| 5,853,020 A | 12/1998 | Widner |
| 5,857,259 A | 1/1999 | Johnston |
| 5,865,631 A | 2/1999 | Berto et al. |
| 5,878,851 A | 3/1999 | Carlson et al. |
| 5,944,539 A | 8/1999 | Ernolf et al. |
| 5,947,754 A | 9/1999 | Lin |
| 5,954,759 A | 9/1999 | Swoyer et al. |
| 5,982,253 A | 11/1999 | Perrin et al. |
| 6,004,168 A | 12/1999 | Fuchs et al. |
| 6,017,238 A | 1/2000 | Johnston |
| 6,036,508 A | 3/2000 | Anderson et al. |
| 6,055,725 A | 5/2000 | Berto et al. |
| 6,126,494 A | 10/2000 | Fuchs et al. |
| 6,135,829 A | 10/2000 | Johnston |
| 6,171,150 B1 | 1/2001 | Saito et al. |
| 6,217,373 B1 | 4/2001 | Johnston |
| 6,230,406 B1 | 5/2001 | Balfour et al. |
| 6,261,137 B1 | 7/2001 | Wilcox |
| 6,283,778 B1 | 9/2001 | Kupnicki et al. |
| 6,305,950 B1 * | 10/2001 | Doorhy .................... 439/76.1 |
| 6,312,280 B1 | 11/2001 | Stevenson |
| D454,333 S | 3/2002 | Ikeda et al. |
| D454,335 S | 3/2002 | Okada |
| 6,371,796 B2 * | 4/2002 | Fukuda ....................... 439/489 |
| 6,372,990 B1 | 4/2002 | Saito et al. |
| 6,384,335 B1 | 5/2002 | Saito et al. |
| 6,388,866 B1 | 5/2002 | Rorvick et al. |
| 6,428,332 B1 | 8/2002 | Nakamura et al. |
| 6,447,305 B1 | 9/2002 | Roberts |
| 6,491,530 B2 | 12/2002 | Koide et al. |
| 6,530,787 B2 | 3/2003 | Harting et al. |
| 6,533,615 B2 | 3/2003 | Koide et al. |
| 6,540,556 B1 | 4/2003 | Fu |
| 6,565,385 B1 | 5/2003 | Anderson et al. |
| 6,565,386 B1 | 5/2003 | Yoneyama et al. |
| 6,603,654 B2 | 8/2003 | Rorvick et al. |
| 6,617,939 B1 | 9/2003 | Vermeersch |
| 6,643,546 B2 | 11/2003 | Mathis et al. |
| 6,652,312 B2 * | 11/2003 | Liegl et al. .................. 439/519 |
| 6,682,361 B2 | 1/2004 | Zweigle |
| 6,683,450 B2 | 1/2004 | Rick et al. |
| D486,794 S | 2/2004 | Okamoto |
| 6,772,505 B1 | 8/2004 | Logan et al. |
| 6,785,576 B2 | 8/2004 | Verness |
| 6,795,729 B1 | 9/2004 | Breyen et al. |
| 6,851,956 B2 | 2/2005 | Saka et al. |
| 6,906,541 B2 | 6/2005 | Kimura |
| 6,963,482 B2 | 11/2005 | Breyen et al. |
| D565,443 S | 4/2008 | Frake et al. |
| 2004/4092154 | 5/2004 | Doorhy |

FOREIGN PATENT DOCUMENTS

| | | |
|---|---|---|
| EP | 0 145 935 | 6/1985 |
| GB | 2 215 150 | 9/1989 |
| JP | 60 181802 | 9/1985 |

OTHER PUBLICATIONS http://materials.globalspec.com/LearnMore/Materials__Chemicals__Adhesives/Electrical__Optical__Specialty__Materials/Encapsulants__Potting__Compounds—About Encapsulants and Potting Compounds (Jun. 20, 2007).

http://www.alu-info.dk/HTML/alulib/modul/A00537.htm—The TIG-welding process (Jun. 20, 2007).

http://www.santoprene.com/cms/site/71cf8d420e13b9cf/—Copyright © 2002-2007 Advanced Elastomer Systems, LP, and ExxonMobin Chemical affiliate—Insert Molding (Jun. 20, 2007).

http://www.dowcorning.com/content/etronics/etronicscoat/etronics_cc__tutorial.asp—© 2000-2006 Dow Corning Corporation—Electronics Solutions (Jun. 20, 2007).

http://www.microplasticsinc.com/what__is__insert__molding.htm—© Microplastics, Inc.—What is Insert Molding? (Jun. 20, 2007).

* cited by examiner

SENSOR ADAPTOR CIRCUIT HOUSING INCAPSULATING CONNECTION OF AN INPUT CONNECTOR WITH A WIRE

CROSS-REFERENCE TO RELATED APPLICATIONS

This application claims the benefit of U.S. Provisional Application No. 60/815,621, filed on Jun. 22, 2006. The disclosure of the above provisional application is incorporated herein by reference in its entirety.

FIELD

The present disclosure relates to sensor assemblies and more specifically to sensor adaptor circuit housings for coupling sensors to networks or measurement instruments and methods of manufacturing such temperature sensor assemblies and housings.

BACKGROUND

The statements in this section merely provide background information related to the present disclosure and may not constitute prior art.

Sensors are used in a wide variety of operational environments to monitor operating and environmental characteristics. These sensors can include temperature, pressure, velocity, position, motion, current, voltage, and impedance sensors, by way of example. They are placed in or associated with the operational environment being monitored and are designed for generating an electrical signal or having an electrical characteristic such as an impedance, voltage or current that varies in response to the changes in values as the monitored operating or environment characteristic changes.

Temperature sensing probes include numerous components, such as, for example, a temperature sensing element, various wiring, resistors, diodes, and switches, among others. Generally, the temperature sensing probe is subjected to harsh environments that easily can damage the components of the temperature sensing probe. Furthermore, the temperature sensing probe is subject to mechanical stress due to vibration from surrounding machinery. To reduce the potential for damage to the probe from environmental and mechanical stress, various packaging schemes have been implemented to protect the measuring circuitry of the probe. However, such packaging schemes and the methods that are used for manufacturing often result in premature failure or a reduction in performance of the temperature sensing probe.

SUMMARY

The present disclosure generally includes temperature sensor assemblies and methods of manufacturing temperature sensor assemblies that are capable of improved performance in harsh temperature sensing environments and that are cost effective to manufacture.

According to one aspect, a sensor adaptor circuit housing assembly includes a circuit board, a housing, an input wire, and a connector. The circuit board includes an electrical circuit configured for receiving a sensor signal and generating a sensor characteristic in response to the received sensor signal. The housing includes a body and a cavity defined by inner surfaces of the body and adapted for receiving the circuit board, the circuit board being positioned within the cavity. The input wire is configured for receiving the sensor signal from a sensor. The connector includes a unitary body, a first end of the unitary body attached directly to an end of the input wire, a second end of the unitary body positioned within the cavity and attached directly to the circuit board and making a first electrical connection with the electrical circuit.

According to another aspect, a sensor adaptor circuit housing assembly includes a circuit board having an electrical circuit configured for receiving sensor signals, and generating sensor characteristics in response to the received sensor signals. A housing has a body and a cavity defined by inner surfaces of the body and adapted for receiving the circuit board, the circuit board being positioned within the cavity, one or more first input wires for receiving a sensor signal from a first sensor, one or more second input wires for receiving a sensor signal from a second sensor, and a plurality of connectors each having a first end attached directly to an end of one of the input wires, a second end positioned within the cavity with each being separately attached directly to the circuit board and making a electrical connections with the electrical circuit.

According to yet another aspect, a method of manufacturing a sensor adaptor circuit housing assembly includes attaching a first end of a connector having a unitary body to a first end of an input wire configured for receiving a sensor signal from a sensor; placing the connector and the first end of the input wire into a mold, wherein a second end of the input wire extends from the mold; molding a housing body having a cavity defined by inner surfaces and adapted for receiving a circuit board, the housing body encapsulating the first end of the connector and an intermediate portion of the connector, a second end of the connector extending freely into the cavity defined by the molding of the housing body, and attaching the second end of the connector directly to the circuit board.

According to still another aspect, a method of manufacturing a sensor adaptor circuit housing assembly includes attaching a first end of a first connector to a first end of a first input wire configured for receiving a sensor signal from a first sensor; attaching a first end of a second connector to a first end of a second input wire configured for receiving a sensor signal from a second sensor; placing the first and second connectors and the first ends of the first and second input wires into a mold, wherein second ends of the first and second input wires extends from the mold and wherein second ends of the connectors extend into a cavity defined by the mold; molding a housing body having a cavity defined by inner surfaces and adapted for receiving a circuit board, the housing body encapsulating the first ends of the connectors and intermediate portions of the connectors, the second ends of the connector extending into the housing body cavity; and attaching the second ends of the first and second connectors directly to the circuit board.

Further aspects of the present invention will be in part apparent and in part pointed out below. It should be understood that various aspects of the disclosure may be implemented individually or in combination with one another. It should also be understood that the detailed description and drawings, while indicating certain exemplary embodiments, are intended for purposes of illustration only and should not be construed as limiting the scope of the disclosure.

DRAWINGS

The following description is merely exemplary in nature and is not intended to limit the present disclosure or the disclosure's applications or uses.

Figure 1A:
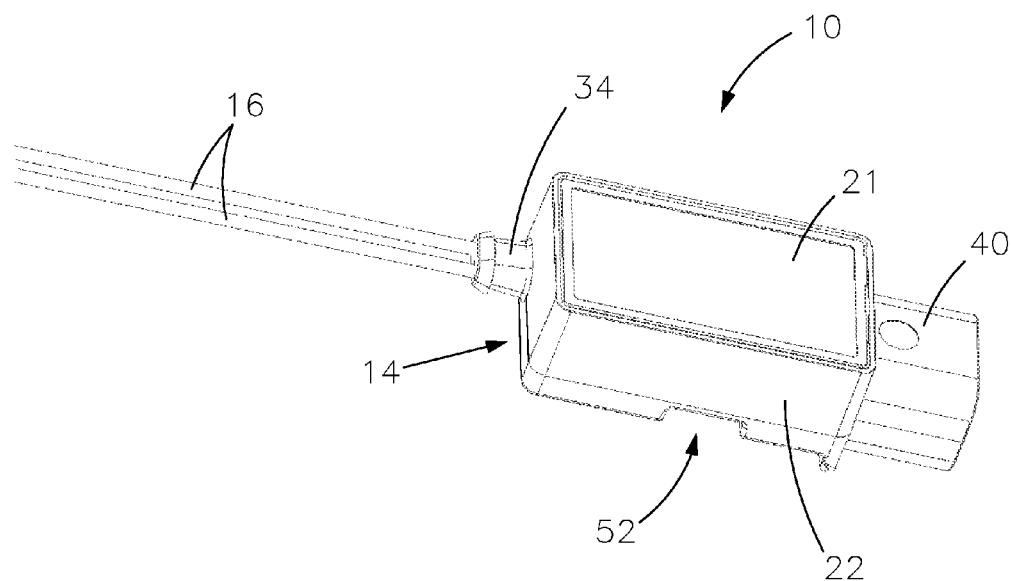
FIG. 1A is a perspective view of one form of a sensor adaptor circuit housing assembly for a single sensor and constructed in accordance with the principles of the present disclosure.
Figure 2:
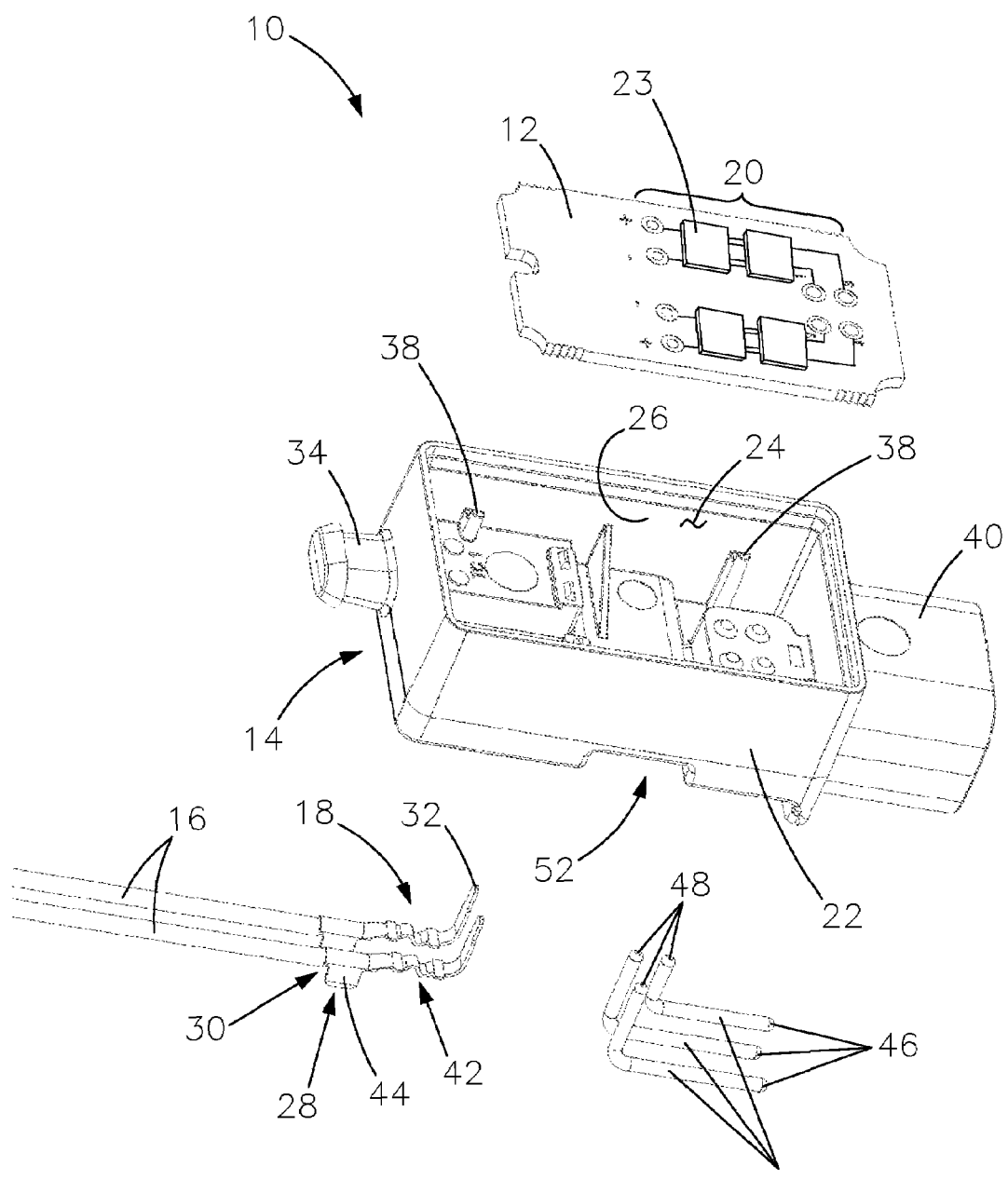
FIG. 2 is an exploded perspective view of the sensor adaptor circuit housing assembly of FIG. 1A constructed in accordance with the principles of the present disclosure.

In one exemplary embodiment, and with reference to FIGS. 1A and 2, a sensor adaptor circuit housing assembly 10 includes a circuit board 12, a housing 14, input wires 16, and connectors 18. The circuit board 12 includes an electrical circuit 20, comprising electrical components 23, configured for receiving a sensor signal and generating a sensor characteristic in response to the received sensor signal. The housing 14 includes a housing body 22 and a cavity 24 defined by inner surfaces 26 of the housing body 22 and adapted for receiving the circuit board 12, the circuit board 12 being positioned within the cavity 24. The input wires 16 are configured to receive the sensor signal from a sensor (not shown) and can be formed with an insulated solid or stranded conductor. Each connector 18 includes a unitary body, a first end 28 of the unitary body attached directly to an end 30 of an input wire 16, and a second end 32 of the unitary body positioned within the cavity 24. Each second end 32 is attached directly to the circuit board 12 and makes a first electrical connection with the electrical circuit 20. Further, the assembly 10 may include a cover 21 over the housing body 22.

Figure 1B:
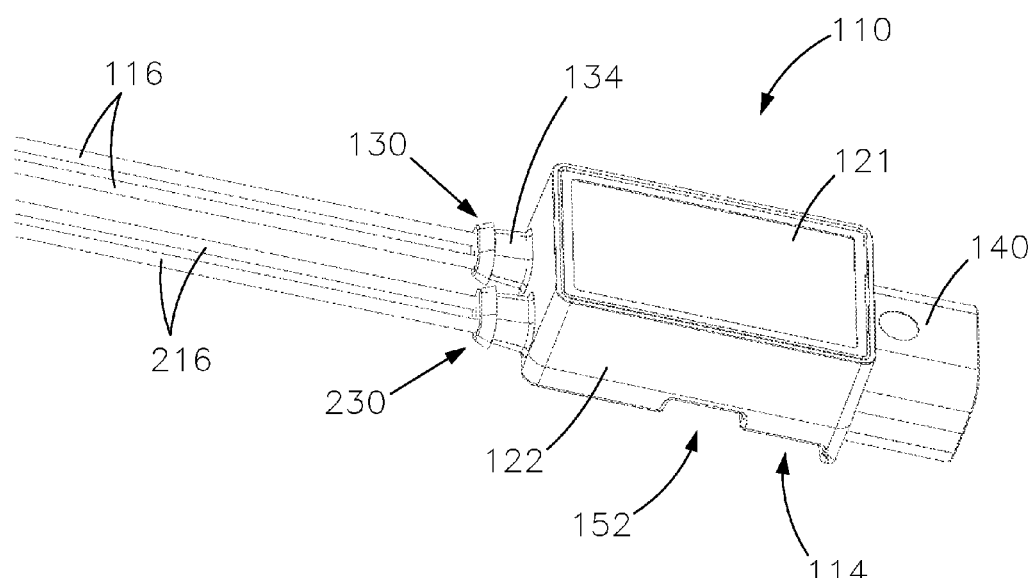
FIG. 1B is a perspective view of another form of a sensor adaptor circuit housing assembly for a dual sensor and constructed in accordance with the principles of the present disclosure.

FIG. 1A illustrates a sensor adaptor circuit housing assembly 10 having a single sensor connection and includes a single set of input wires 16 and input interface 34 for receiving the input wires 16. Although the present embodiment shows two wires 16, a single wire 16 or more than two wires 16 could be used, without falling beyond the spirit and score of the present invention. In this example, the input wire interface 34 includes a molded-in assembly encapsulating the input wires 16 and thereby fixedly securing the wires 16 to the housing 14. FIG. 1B illustrates a dual sensor adaptor circuit housing assembly 110 having two input wire sets 116 and two input interfaces 134. This assembly 110 of FIG. 1B will be described in further detail below.

With reference to FIG. 2, an exploded view of of the sensor adaptor circuit housing assembly 10 of FIG. 1A is illustrated. The assembly 10 includes two input wires 16, each attached to an input connector 18 having a unitary body with a sinuous body portion 42. The assembly 10 further includes a plurality of output connectors/pins 36. Both the input connectors 18 and the output connectors/pins 36 are formed with right angles for directly attaching to holes in the circuit board 12, once the circuit board 12 is positioned in the cavity 24 of the housing 14. The output connectors/pins 36 have first ends 46 that extend into an output interface housing 40 to further connect the assembly 10. In addition, the output connectors/pins 36 have second ends 48 that extend into the cavity 24 of the housing 14. The housing cavity 24 includes mounting supports such as columns 38 to mount the circuit board 12 in the cavity 24 at a predefined elongated distance from the inner surfaces 26 of the housing cavity 24.

Figure 3:
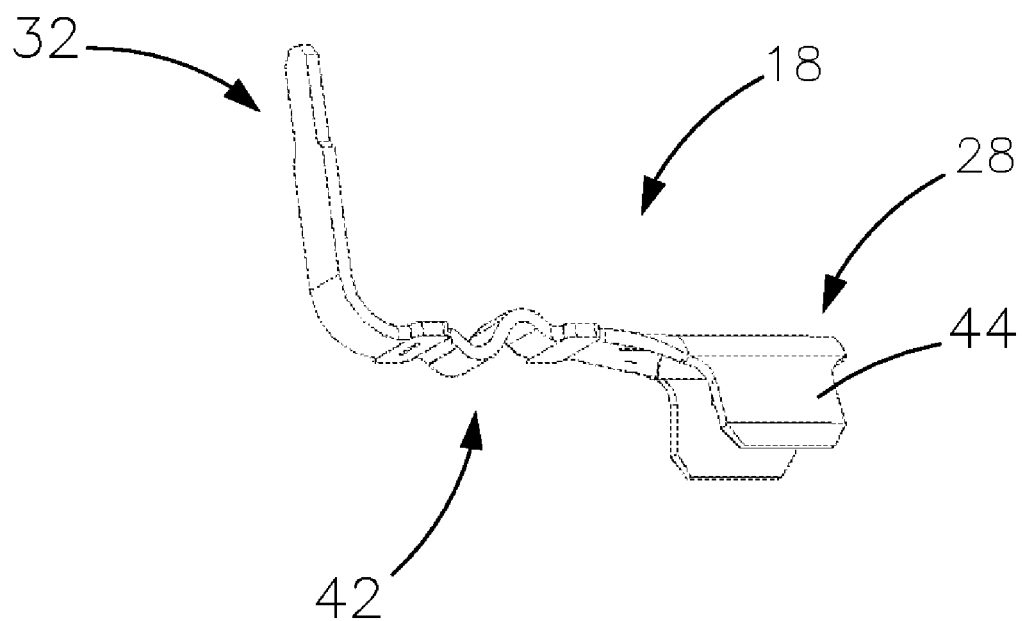
FIG. 3 is a perspective view of a connector for the sensor adaptor circuit housing assembly of FIGS. 1A and 2 constructed in accordance with the principles of the present disclosure.

Referring now to FIG. 3, a connector 18 is illustrated in more detail. As shown, the connector 18 can having an elongated body and can include a sinuous body portion 42 between the first end 28 and the second end 32 of the connector 18. Such an elongated body uses more metal than required to connect the input wires 16 to the circuit board 12, but the elongated body provides for an increased moisture path between the first end 28 and the second end 32 of the connector 18. In such a manner, moisture migration is deterred thereby providing for less likelihood of failure due to moisture. As shown, the sinuous body of the connector 18 can be formed from a substantially flat metal bar having one or more curves between the first end 28 and second end 32 providing the sinuous body portion 42. Of course, other structures and forms are also possible as known to those skilled in the art.

As shown in FIGS. 2 and 3, the connectors 18 and the housing 14 can be configured such that the sinuous body portions 42 of the connectors 18 and the ends 30 of the input wires are substantially encapsulated by a portion of the housing body 22 and wherein the second ends 32 of the connectors 18 are positioned at about ninety degree angles from the first ends 28 of the connectors 18. The wires 16 may comprise a conductor surrounded by an insulating covering. The first ends 28 of the connectors 18 may have compression couplers 44, each coupler 44 being compressively coupled to a conductor at a first end 30 of an input wire 16.

Figure 4:
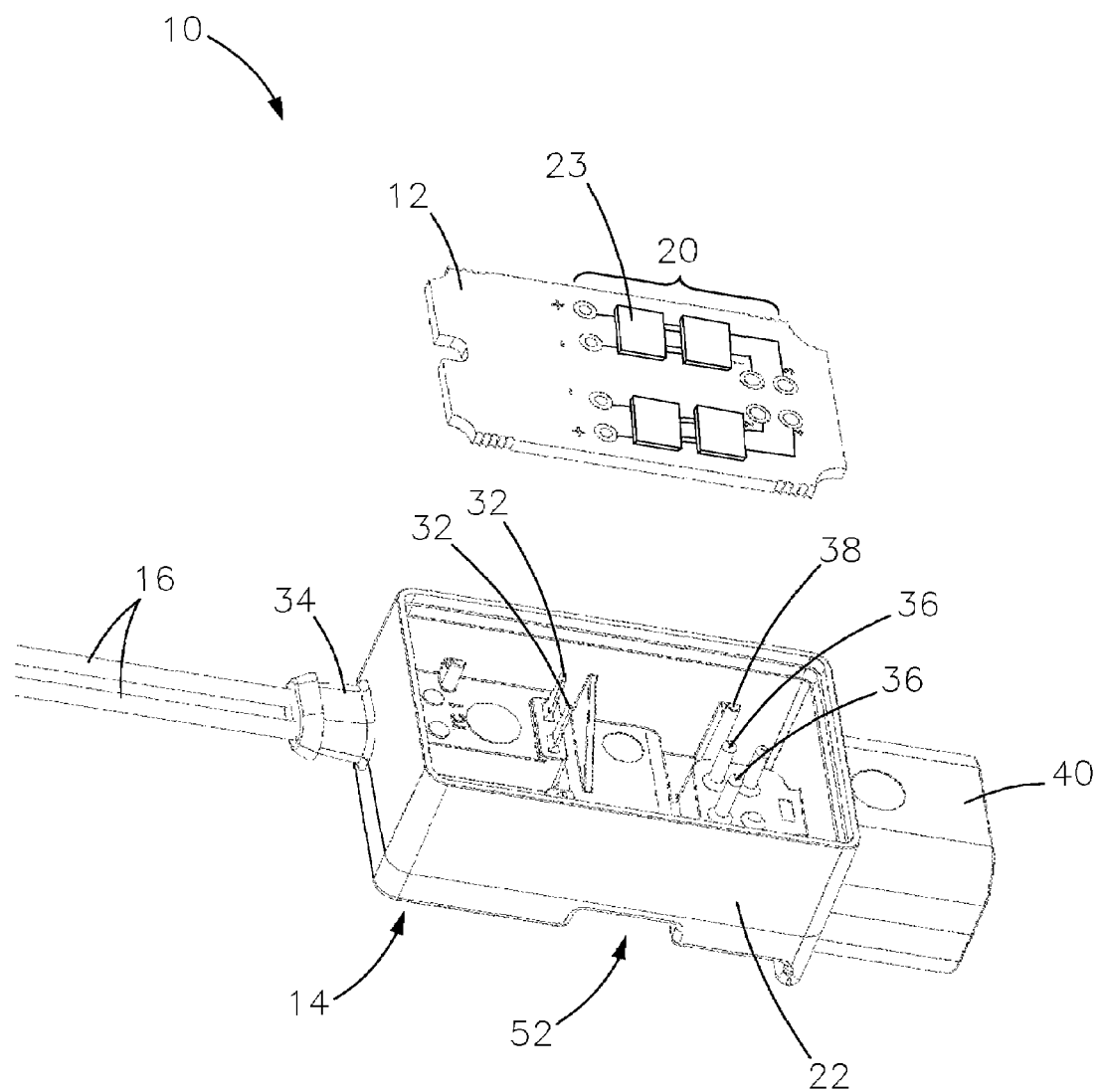
FIG. 4 is an exploded perspective view of the sensor adaptor circuit housing assembly of FIGS. 1A and 2, the sensor adaptor circuit housing assembly being partially assembled and constructed in accordance with the principles of the present disclosure.

Referring now to FIG. 4, the input wires 16 and connectors 18 have been at least partially encapsulated within the housing body 22 with one end 32 of each connector 18 being exposed within the cavity 24 for directly attaching to the circuit board 12. Similarly, the output connectors/pins 36 have been partially encapsulated within the housing body 22 for also directly attaching to the circuit board 12.

Figure 5:
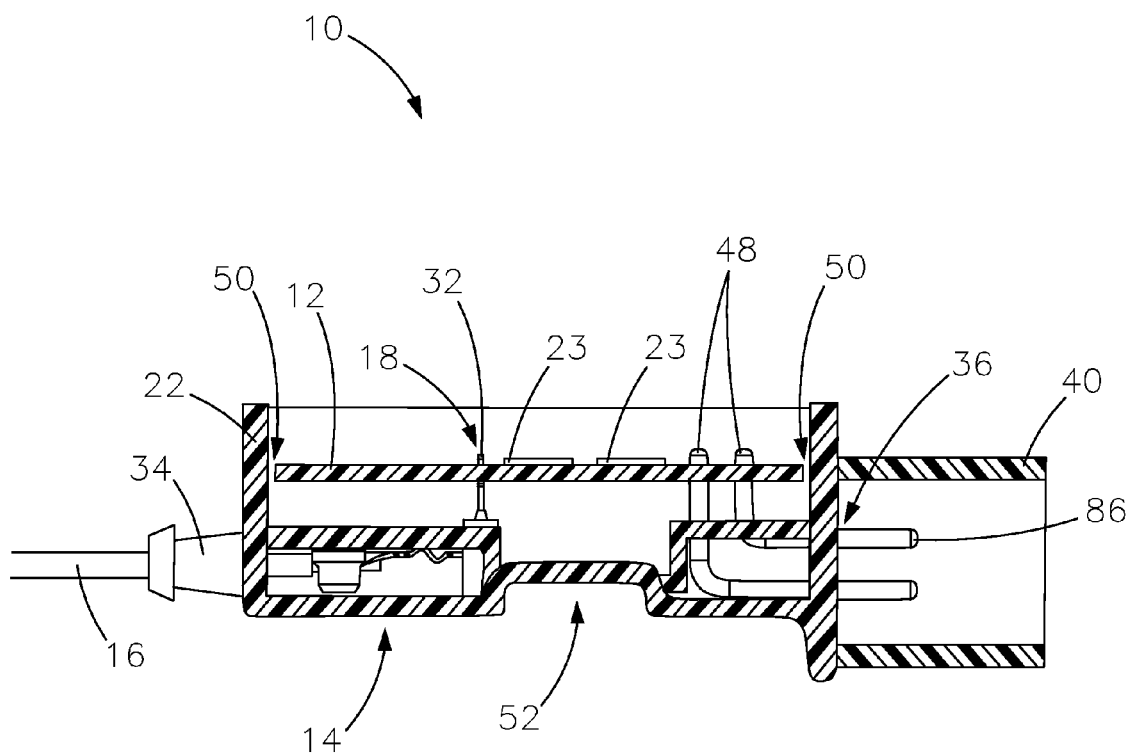
FIG. 5 is a cut-away side view of the sensor adaptor circuit housing assembly of FIGS. 1A, 2, and 4 constructed in accordance with the principles of the present disclosure.

With reference to FIG. 5, the connectors 18 and the output connectors/pins 36 are shown partially encapsulated within the housing body 22 as described above. The second ends 32 of the connectors 18 and the second ends 48 of the output connectors/pins 36 can be disposed through a hole defined by the circuit board 12 and electrically connected to the circuit board 12, for example by soldering, welding, or bonding. All or a portion of the first end 30 of each input wire 16 and each connector 18 can be encapsulated substantially or at least in part within a portion of the housing 14. Such encapsulation can be accomplished by assembling various housing 14 portions to form an integrated body, or it can be accomplished by molding or otherwise encapsulating the connectors 18 and wire ends 30 within the housing 14.

As shown in FIGS. 2, 4, 5 and 6, an output can include output connectors or pins 36 and an output interface housing 40 for interfacing to an external mating connector. The output connectors/pins 36 can have a hollow or solid bodies and can each be comprised of multiple components or can be unitary bodies. The first end 46 of each output connector/pin 36 can be disposed external to the housing body 22 and can be configured for attaching directly to a mating portion of the external mating connector (not shown). The second ends 48 of the connectors/pins 36 can be positioned within the cavity 24 and attached directly to the circuit board 12 to make an electrical connection thereto. The output connectors/pins 36 can be formed by bending, by way of example, to have angles such as substantially right angle bends between the first ends 46 and the second ends 48 of the output connectors/pins 36, by way of example, and as illustrated in the exemplary embodiment of FIGS. 5-6.

Figure 6:
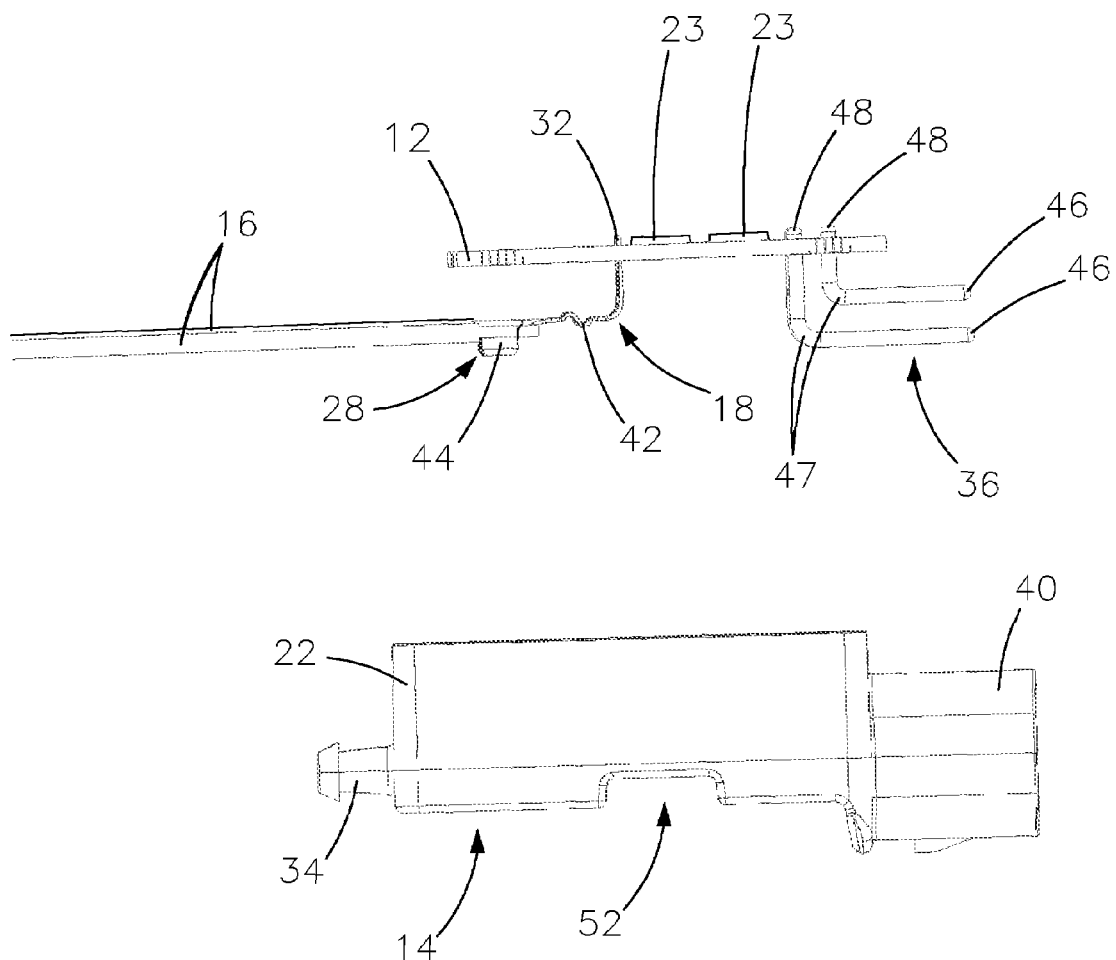
FIG. 6 is a side exploded perspective view of adaptor circuit housing assembly of FIGS. 1A, 2, 4, and 5 constructed in accordance with the principles of the present disclosure.

As shown in FIG. 6, the second ends 48 of the output connectors/pins 36 are attached directly to the circuit board 12, in some embodiments, and can be disposed through a hole defined by the circuit board 12 and electrically connected to the circuit board 12.

Intermediate portions 47 of the output connectors/pins 36 can be partially or substantially encapsulated by a portion of the housing body 22 either by mechanical assembly of the housing body 22 or by molding the output connectors/pins 36 into the housing body 22.

The electrical circuit 20 generally includes electrical components 23 mounted to one or more sides of the circuit board 12. In one preferred embodiment, all of the electrical components 23 are mounted on a single or common side of the circuit board 12. One or more of the electronic components 23 can be covered or coated with a conformal coating such as a urethane, silicone, or paraxylylene conformal coating. Such a coating can be immediately cured or cured over time.

Additionally, the circuit board 12 can be dimensioned to have a width and a length that are each smaller than the corresponding body cavity inner surfaces 26. Thus, with reference to FIG. 5, gaps 50 exist between the inner walls 26 of the housing body 22 and the edges of the circuit board 12, wherein a potting or an encapsulant may be disposed.

Figure 7:
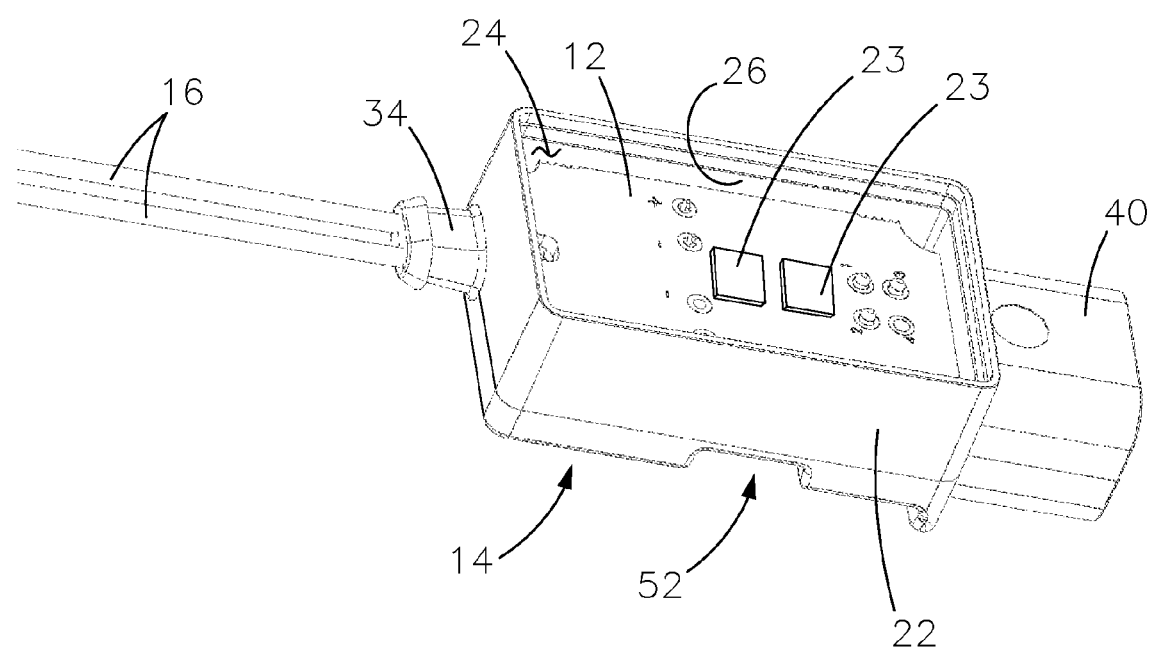
FIG. 7 is a perspective view of the adaptor circuit housing assembly of FIGS. 1A, 2, and 4-6, the adaptor circuit assembly being partially assembled and constructed in accordance with another form of the present disclosure.

In some embodiments, the housing body 22 can include one or more supports within the cavity 24 that are dimensioned for mounting the circuit board 12 at a predetermined position within the cavity 24. For example, supports can be formed as columns 38 that have been dimensioned and adapted for mounting the circuit board 12 at a predefined elongated distance from the inner surfaces 26 of the cavity 24. Such a predefined elongated distance is preferably defined and specified to provide for a lengthened or elongated moisture path between the inner surfaces 26 of the housing body 22 and the circuit board 12. In such a manner, moisture can be minimized and damage to the circuit board 12 and electronics 23 contained thereon can also be minimized. FIG. 7 shows the circuit board 12 being disposed in the cavity 24 on the columns 38 (hidden by the circuit board 12).

The housing body 22 can also define an input wire coupling structure 34 extending from an exterior surface of the housing body 22 and encapsulating a length of the input wires 16 external to the housing body 22. The input wire coupling structure 34 could have a barb on an external surface for securing an external structural component to the input wire coupling structure 34 about a portion of the input wires 16.

As shown in FIG. 1A, in some embodiments, a cavity sealer is positioned, dimensioned and/or adapted for closing and substantially sealing the cavity 24. This can include a cover 21 for covering the cavity 24 opening, a potting material that is filled into the cavity 24 to form a cover 21 and possibly to partially or completely encapsulate the circuit board 12 and/or electronics 23 contained thereon. Additionally, other fillers and encapsulants as known in the art may also or alternatively be used, such as a cavity sealer, a filler, an encapsulant, or a conformal coating, and any combination of two or more can also be used. In some embodiments, the cavity sealer includes a potting such as a resin, an adhesive, silicone, enoxy, or urethane, by way of example.

In some embodiments, merely one input wire 16 associated with a sensor is employed for receiving the sensor signal. In such cases, merely one connector 18 is associated with the wire 16.

In some embodiments, the housing 14 can be designed to enable the easy mounting of the housing 14 within an operating environment. For example, one or more exterior surfaces of the housing 14 can include a saddle 52 or securing surface or fixture for receiving a mounting device. The mounting device (not shown) can include a wire strap, tie cable, clip, or clamp, by way of example.

With reference to FIG. 1B, in another exemplary embodiment, a sensor adaptor circuit housing assembly 110 includes a circuit board (not shown) having an electrical circuit configured for receiving sensor signals and generating sensor characteristics in response to the received sensor signals. A housing 114 has a housing body 122 and a cavity (not shown) defined by inner surfaces of the housing body 122 and adapted for receiving the circuit board, the circuit board being positioned within the cavity. One or more first input wires 116 are provided for receiving a sensor signal from a first sensor. The assembly 110 also includes one or more second input wires 216 for receiving a sensor signal from a second sensor. Further, the assembly 110 has a plurality of connectors (not shown), each having a first end attached directly to an end of one of the input wires 116, 216 and a second end positioned within the cavity. The assembly 110 of FIG. 1B is substantially similar to the assembly 10 of FIGS. 1A and 2-7; for example, it has an input interface 134, a cover 121, a saddle 152, an output housing interface 140 in which output connectors/pins extend, and input connectors connecting the wires 116, 216 to provide an electrical and mechanical connection to the circuit board. In this embodiment, each wire 116, 216 is separately attached directly to the circuit board.

Similarly to the embodiment of FIGS. 1A and 2-7, the embodiment of FIG. 1B may have connectors (not shown) configured such that the first end and the sinuous body of each connector and the ends 130, 230 of the each input wire 116, 216 can be substantially encapsulated by a portion of the housing body 122 and wherein the second ends of each connector are position at about a ninety degree angle from the first ends of each connector.

Similarly to the embodiment of FIGS. 1A and 2-7, in the embodiment of FIG. 1B, each input wire 116, 216 may include a conductor and an insulated covering, and each first end of each connector may include a compression coupler compressively coupled to a conductor at the first ends 130, 230 of each input wire 116, 216. Additionally, in some embodiments the ends 130, 230 of each input wire 116, 216 and a portion of each connector including the attachments to each input wire 116, 216 are substantially encapsulated within portions of the housing 114.

Similarly to the embodiment of FIGS. 1A and 2-7, in the embodiment of FIG. 1B, an output may be provided that includes at least one output connector/pin for interfacing to an external mating connector. The output connector/pin may have a unitary body a first end disposed external to the housing body 122 that is configured for attaching directly to a mating portion of the external mating connector, a second end within the cavity attached directly to the circuit board and making an electrical connection with the electrical circuit, and an intermediate portion between the first end and the second end substantially encapsulated by a portion of the housing body 122.

Additionally, the electrical circuit pertaining to the embodiment of FIG. 1B includes a plurality of electrical components mounted to a common side of the circuit board. A conformal coating may cover a portion of the electrical components, wherein the conformal coating is selected from the group consisting of urethane, silicone, and paraxylylene.

Similarly to the embodiment of FIGS. 1A and 2-7, in the embodiment of FIG. 1B, the housing body 122 may include supports within the cavity dimensioned for mounting the circuit board at a predetermined position within the cavity. The cavity, supports, and circuit board can be designed such that the circuit board is mounted having a predefined elongated distance from the inner surfaces of the housing body 122, which surround the cavity to define the cavity. Additionally, the circuit board is dimensioned to have a width and a length that are each smaller than the corresponding body cavity inner surfaces. In some such embodiments, a potting or an encapsulant is disposed between edges of the circuit board defining the width and length and the housing body cavity inner surfaces.

Figure 8:
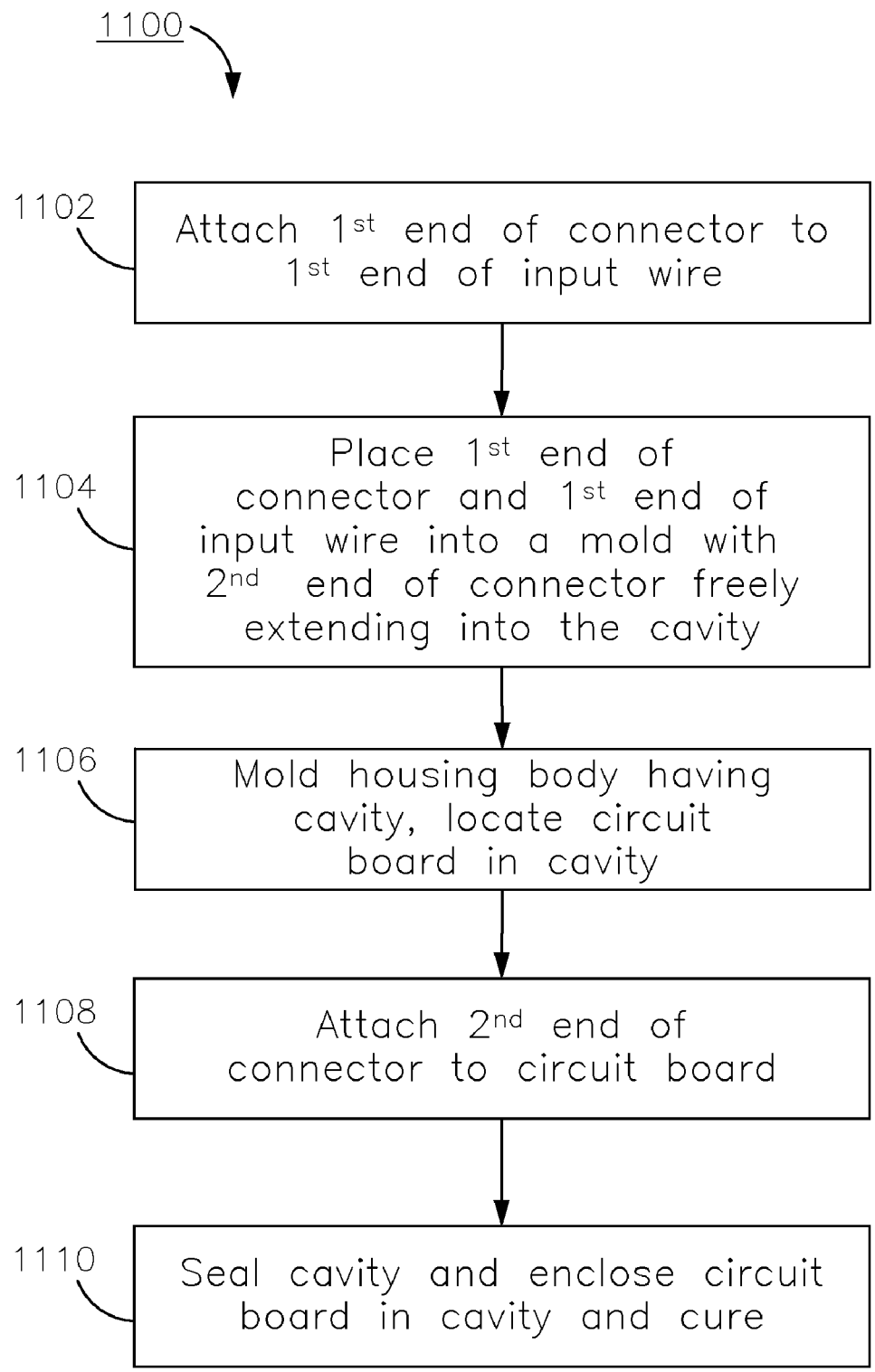
FIG. 8 is a flow chart illustrating a method of manufacturing a sensor adaptor circuit housing assembly in accordance with the principles of the present disclosure.

In another embodiment, as shown by way of example in the flow chart of FIG. 8, a method 1100 of manufacturing a sensor adaptor circuit housing assembly includes a step 1102 of attaching a first end of a connector having a unitary body to a first end of an input wire configured for receiving a sensor signal from a sensor, another step 1104 of placing the connector and the first end of the input wire into a mold, wherein a second end of the input wire extends from the mold and a second end of the connector freely extends into the cavity another step 1106 of molding a housing body having a cavity defined by inner surfaces and adapted for receiving a circuit board, the housing body encapsulating the first end of the connector, and another step 1108 of attaching the second end of the connector directly to the circuit board.

As describer herein, it should be understood that molding is intended to include any type of molding, such as injection molding, compression molding, transfer molding, and RIM molding, by way of example.

As described above, the method 1100 can also include attaching the first end of the connector to the first end of the input wire and crimping the first end of the connector about a conductor of the input wire.

Of course as understood by those skilled in the art, the connector itself can be formed by various methods including, by way of example, forming the connector from a metal to have a bar shape and shaping the bar to have a sinuous shape in an intermediate portion. For example, a manufacturing process according to one embodiment can include shaping the connector from a continuous piece of metal prior to attaching the connector to the first end of the input wire, the shaping including forming a crimp portion on the first end of the connector adapted for crimping about the first end of the input wire and bending an intermediate portion of the connector to have a sinuous shape. This can also include forming the connector, which may include bending the connector to position the second end of the connector at about a ninety degree angle from the first end of the connector.

As noted above, the method can also include forming an output connector such as the ones described above, by way of example. This can include forming the output connector prior to placing the output connector in the mold, the forming including forming the output connector having a solid body with a pin shape and bending the body about an intermediate portion to form a right angle, or any other suitable angle, such as an angle that approximates a right angle. Once formed, the method can include placing an output connector in the mold with a first end of the output connector extending from the mold, wherein molding the housing body includes encapsulating an intermediate portion of the output connector. The method can further include attaching a second end of the output connector to the circuit board.

After the circuit board is installed in the cavity and connected to the input connectors and the output connector or output connectors, the method 1100 may include a step 1110 of sealing the cavity with a cavity sealer that encloses the circuit board within the cavity. The sealing process can include installing one or more cavity sealers such as a cover, a potting, a filler, an encapsulant, and a conformal coating, by way of example. Some of these may also require curing or may cure over time.

Additionally, prior to installing the circuit board, one or more electronic components on the circuit board may have a conformal coating applied and possibly cured.

Figure 9:
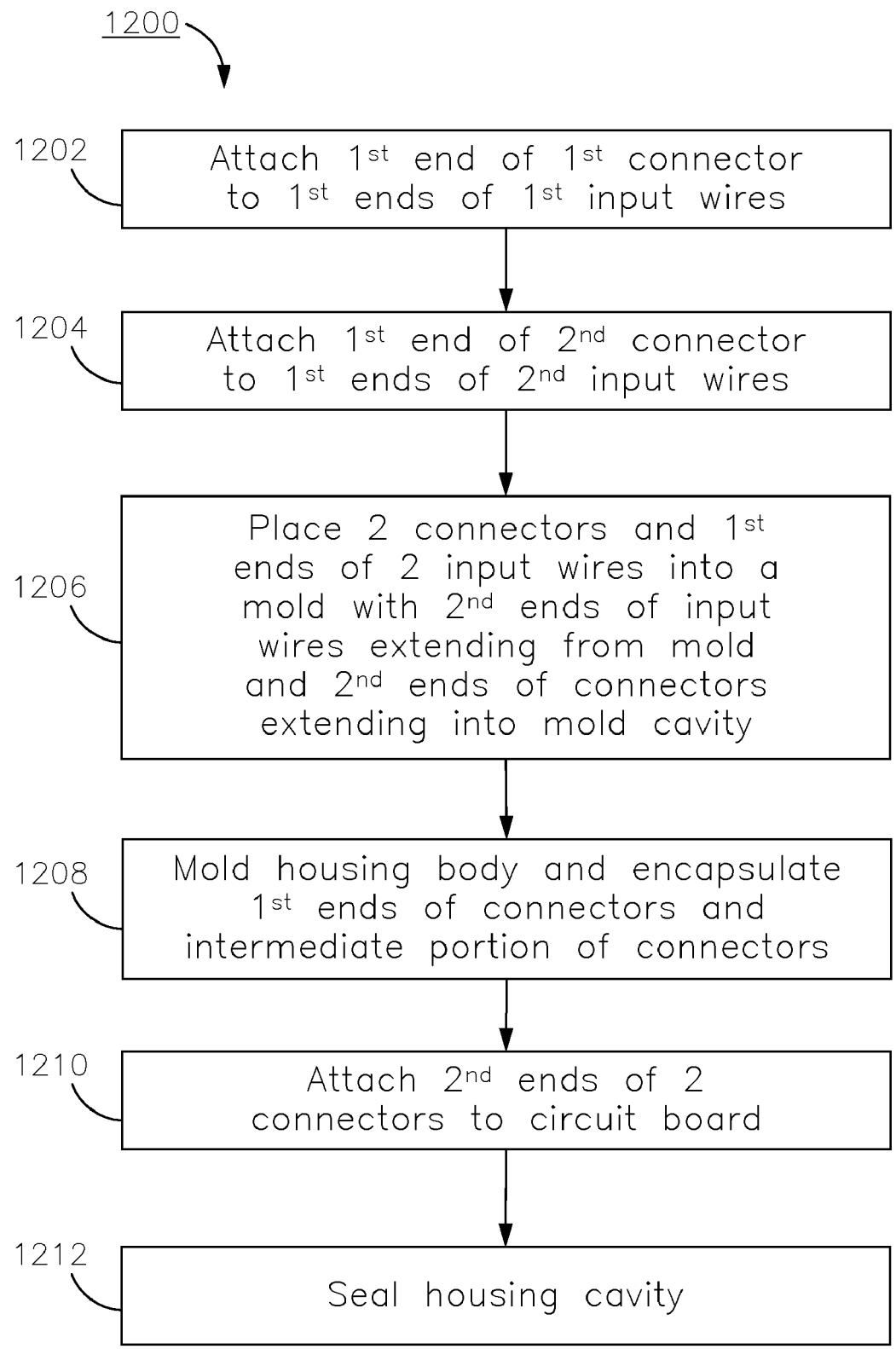
FIG. 9 is a flow chart illustrating another method of manufacturing a sensor adaptor circuit housing assembly in accordance with the principles of the present disclosure.

As shown in FIG. 9, in another exemplary embodiment a method 1200 of manufacturing a sensor adaptor circuit housing assembly includes a step 1202 of attaching a first end of a first connector to a first end of a first input wire configured for receiving a sensor signal from a first sensor, another step 1204 of attaching a first end of a second connector to a first end of a second input wire configured for receiving a sensor signal from a second sensor, another step 1206 of placing the first and second connectors and the first ends of the first and second input wires into a mold, wherein second ends of the first and second input wires extend from the mold and wherein second ends of the connectors extend into a cavity defined by the mold, another step 1208 of molding a housing body having a cavity defined by inner surfaces and adapted for receiving a circuit board, the housing body encapsulating the first ends of the connectors and intermediate portions of the connectors, the second ends of the connectors extending into the housing body cavity, and another step 1210 of attaching the second ends of the first and second connectors directly to the circuit board. Like the previously described method 1100, the method 1200 of FIG. 9 could include a step 1212 of sealing the housing cavity.

Further details of the temperature sensor, housing, and other components are described in greater detail in copending application titled "Temperature Sensor Assembly and Method of Manufacturing Thereof," filed concurrently herewith on Jun. 22, 2007, which is commonly assigned with the present application and the contents of which are incorporated herein by reference in their entirety.

When describing elements or features and/or embodiments thereof, the articles "a", "an", "the", and "said" are intended to mean that there are one or more of the elements or features. The terms "comprising", "including", and "having" are intended to be inclusive and mean that there may be additional elements or features beyond those specifically described.

Those skilled in the art will recognize that various changes can be made to the exemplary embodiments and implementations described above without departing from the scope of the disclosure. Accordingly, all matter contained in the above description or shown in the accompanying drawings should be interpreted as illustrative and not in a limiting sense.

It is further to be understood that the processes or steps described herein are not to be construed as necessarily requiring their performance in the particular order discussed or illustrated. It is also to be understood that additional or alternative processes or steps may be employed.

What is claimed is:

1. A sensor adaptor circuit housing assembly comprising:
   a circuit board having an electrical circuit configured to receive a sensor signal and generate a sensor characteristic in response to the received sensor signal;
   a housing having a housing body and a cavity defined by inner surfaces of the housing body, the circuit board being positioned within the cavity;
   an input wire configured to receive the sensor signal from a sensor;
   an input connector having a unitary body, a first end of the unitary body attached directly to an end of the input wire, the end of the input wire and the first end of the unitary body being at least partially encapsulated within a portion of the housing, a second end of the unitary body positioned within the cavity and attached directly to the circuit board and making a first electrical connection with the electrical circuit; and
   an output connector configured to interface to an external mating connector, the output connector having a unitary body and a first end disposed external to the housing body, the first end of the output connector being configured to attach directly to a mating portion of the external mating connector, the output connector having a second end disposed within the cavity and attached directly to the circuit board, the second end of the output connector making a second electrical connection with the electrical circuit.

2. The assembly of claim 1 wherein the unitary body of the connector includes a sinuous body portion between the first end and the second end of the unitary body to increase the moisture path between the first end and the second end of the unitary body.

3. The assembly of claim 2 wherein the sinuous body portion of the unitary body of the connector comprises a substantially flat metal bar having one or more curves between the first end and second end.

4. The assembly of claim 2 wherein the first end and the sinuous body portion of the unitary body of the connector and the end of the input wire are substantially encapsulated by a portion of the housing body and wherein the second end of the unitary body of the connector is positioned at about a ninety degree angle from the first end of the unitary body of the connector.

5. The assembly of claim 1 wherein the second end of the unitary body of the connector is disposed through a hole defined by the circuit board.

6. The assembly of claim 1 wherein the input wire includes a conductor and an insulated covering, and the first end of the unitary body of the connector includes a compression coupler compressively coupled to the conductor at the end of the input wire.

7. The assembly of claim 6 wherein the input wire includes a stranded conductor.

8. The assembly of claim 1 wherein the end of the input wire and the first end of the unitary body of the connector are substantially encapsulated within a portion of the housing.

9. The assembly of claim 1, further comprising a cavity sealer positioned and dimensioned for closing and substantially sealing the cavity.

10. The assembly of claim 9 wherein the cavity sealer includes at least one of a cover, a potting, a filler, an encapsulant, and a conformal coating.

11. The assembly of claim 9 wherein the cavity sealer includes a potting selected from the group consisting of a resin, an adhesive, silicone, epoxy, and urethane.

12. The assembly of claim 1 wherein the output connector is a solid pin having a substantially right angle bend between the first end and the second end of the output connector.

13. The assembly of claim 12 wherein the second end of the output connector pin is disposed through a hole defined by the circuit board.

14. The assembly of claim 1 wherein the electrical circuit includes a plurality of electrical components mounted to a common side of the circuit board, and a conformal coating covers at least a portion of the electrical components.

15. The assembly of claim 14 wherein the conformal coating is selected from the group consisting of urethane, silicone, and paraxylylene.

16. The assembly of claim 1 wherein the circuit board has edges defining a width and length, the circuit board being dimensioned such that the width and a length are each smaller than the corresponding inner surfaces of the housing body and wherein a potting or an encapsulant is disposed between the edges of the circuit board and the inner surfaces of the housing body.

17. The assembly of claim 1 wherein the housing body includes a plurality of supports within the cavity dimensioned for mounting the circuit board at a predetermined position within the cavity.

18. The assembly of claim 17, where the plurality of supports comprise a plurality of support columns supporting the circuit board at a predefined distance from the inner surfaces of the housing body.

19. The assembly of claim 1, wherein the input wire is a first input wire and the input connector is a first connector, the assembly further comprising a second input wire associated with the sensor and cooperating with the first input wire to receive the sensor signal, and a second input connector having a unitary body, a first end of the unitary body of the second input connector attached directly to an end of the second input wire, a second end of the unitary body of the second input connector positioned within the cavity and attached directly to the circuit board and making a third electrical connection with the electrical circuit.

20. A sensor adaptor circuit housing assembly comprising:
   a circuit board having an electrical circuit configured to receive sensor signals and generate sensor characteristics in response to the received sensor signals;
   a housing having a housing body and a cavity defined by inner surfaces of the housing body, the circuit board being positioned within the cavity;
   a first input wire configured to receive a sensor signal from a first sensor;
   a second input wire configured to receive a sensor signal from a second sensor;
   a plurality of input connectors, each input connector of the plurality of input connectors having a first end attached directly to an end of one of the first and second input wires, the ends of the first and second input wires and the first ends of the input connectors being at least partially encapsulated within a portion of the housing, a second end positioned within the cavity, each second end being separately attached directly to the circuit board and making an electrical connection with the electrical; and
   a plurality of output connectors configured to interface to an external mating connector, each output connector of the plurality of output connectors having a first end disposed external to the housing body, the first ends being configured to attach directly to a mating portion of the external mating connector, each output connector of the plurality of output connectors having a second end disposed within the cavity and separately attached directly to the circuit board and making an electrical connection with the electrical circuit.

21. The assembly of claim 20 wherein each input connector has a unitary body and a sinuous body portion located between the first end and the second end of each input connector, the sinuous body portion including more than one curve, and wherein the second end of each input connector is positioned at about a ninety degree angle from the first end of each input connector.

22. The assembly of claim 20, further comprising a potting material substantially closing and sealing the cavity, the potting material being selected from the group consisting of a resin, an adhesive, silicone, epoxy, and urethane.

23. The assembly of claim 20, wherein the housing body includes a plurality of support columns supporting the circuit board at a predefined distance from the inner surfaces of the housing body.

* * * * *